UNITED STATES PATENT OFFICE.

GEORGE D. VAN ARSDALE AND CHARLES G. MAIER, OF NEW YORK, N. Y.

PROCESS FOR THE TREATMENT OF MANGANESE ORES.

1,348,068.　　　　　　　　Specification of Letters Patent.　　Patented July 27, 1920.

No Drawing.　　　　Application filed May 9, 1918. Serial No. 233,545.

*To all whom it may concern:*

Be it known that we, GEORGE D. VAN ARSDALE and CHARLES G. MAIER, citizens of the United States, residing at New York, in the county of New York and State of New York, have invented certain new and useful Improvements in Processes for the Treatment of Manganese Ores, of which the following is a specification.

The present invention is a process for the treatment of ores of manganese for the purpose of obtaining from them a high grade manganese product suitable for metallurgical use.

Ores of manganese containing high percentages of manganese are seldom found in nature; for example, ore in which the content of manganese dioxid is equal to or greater than 75% to 85% is not found in large amounts in this country. Furthermore, even a very high grade manganese dioxid ore containing, for example, 85% manganese dioxid will contain only a little over 50% metallic manganese. It is easily understood that in the metallurgical treatment of ores, furnace capacity and facility of reduction are directly proportional to an increase in the metal content of the ore. It is also true that for reduction either in the electric furnace or a blast furnace, or otherwise, the dioxid form in which manganese frequently occurs in ores will require, in the blast furnace for example, decidedly more fuel per unit of manganese than an oxid containing a higher percentage of metal. Also some ores carrying manganese as oxids are frequently of a hydrated character, and if the water of hydration is driven off by heating, the product will be unsuitable for furnacing without briqueting or other treatment to change the product from its finely powdered condition to a condition suitable for such use. The present invention is a process for the treatment of manganese ores designed to obtain a product having a relatively high percentage of manganese so that with a given furnace capacity, a maximum quantity of the manganese product may be reduced with facility and with a considerable saving in fuel. Another important object of the invention is to provide for obtaining the product in a form highly suitable for metallurgical use or more specifically in sintered form as distinguished from the powdered product.

More specifically the invention provides a process for the treatment of manganese ores in which the manganese occurs as oxid in a manner to obtain a product in which the percentage of manganese will be much higher than in the original material and possessing characteristics rendering it highly suitable for metallurgical use without further treatment.

A further object of the invention is to formulate a process for the treatment of low grade manganese ores unsuitable for metallurgical use which may be carried out on a commercial scale with satisfactory results and at a low cost, and which if desired may be rendered partly or wholly cyclic in its character.

In carrying out our process we have found that most oxid compounds of manganese are readily rendered soluble, when suspended in water, by the action of sulfur dioxid or mixtures of sulfur dioxid and trioxid; that a solution of manganese sulfur salts of any desired strength up to the limit of a saturated solution in water may be derived from a low grade manganese ore by separating the solution obtained through the treatment of one batch of ore with sulfur dioxid and using this solution, as a substitute for water, employed in the first instance, for treating a fresh batch of the ore; that therefore by consumption of little fuel and in a relatively short time, the solution may be evaporated to obtain anhydrous manganous salts and also some other salts, extracted from the ore; that the crude salt thus obtained can be readily dissociated by the action of heat so as to yield substantially pure oxids of manganese; that by the application of heat at the proper degree of temperature and for a sufficient time to the crude salt, there may be obtained a sintered product highly suitable for blast furnace or other metallurgical use and therefore quite different from the finely powdered oxid of manganese which would be obtained by the calcination of pure sulfate of manganese; and, that any sulfur finally present in the calcine will be largely in the form of water soluble salts which if objectionable can be readily removed from the sinter, substantially without effecting its sintered character by sufficient washing.

In carrying out the process, the ore is first ground to suitable fineness which will naturally vary with the quality of the ore to be treated. We have found that for an Arizona ore grinding to about twenty mesh is sufficient. Coarser material than this may be treated, but the time required for dissolution will, of course, be longer. The ground ore is added to a suitable quantity of water contained in a closed agitating tank having any suitable device for preventing the ore from settling, and also provided with an inlet and an outlet pipe for gas, and further provided with suitable means for pumping the gas through a sufficient layer of the pulp. Into this pulp sulfur dioxid gas or mixed sulfur gases from any suitable source is continuously passed and agitation of the mixture is continued until the solution of the soluble manganese content of the ore is complete. The source of the gas may be waste gas from a roasting furnace, where the process of the present invention is carried out in the vicinity of such a furnace employed in oxidizing ores or concentrates of copper, or as will be presently explained, the gas which is obtained as a by-product in a further step of the process of the present invention, may be made use of thus rendering the process, to this extent, cyclic. The gas is not required to be of great strength, for we have found that by making use of a gas containing from 6% to 8% sulfur dioxid, we may obtain an extraction of more than 90% of the manganese from some ores.

It is evident that when a low grade ore is being treated, it will not be possible in any practicable dilution of pulp to obtain a solution of manganous salts approaching saturation. It is also evident that in most places, on account of the cost of fuel, it would not be practical commercially to evaporate a dilute solution, whereas on the other hand it might be entirely practical commercially to evaporate a highly concentrated or saturated solution. In order to obtain such a solution therefore we separate the solution of manganous salts obtained in the treatment of the first batch of ore in the step above described, from the gangue, which can be done for example, in a series of Dorr thickeners, using the counter-current principle of washing and employing this partly saturated solution in the treatment of a fresh batch of the ore, the solution serving as a substitute for the water initially employed in the suspension of the powdered ore. At this point it may be stated that this step is systematically followed in the treatment of succeeding batches of the ore, employing the solution obtained and removed respectively, during and subsequent to the treatment of one batch of ore in the suspension and similar treatment of the next succeeding batch, and until there has been obtained a solution which is highly concentrated or substantially saturated. We have found that this possibility of obtaining a nearly saturated solution is a very important factor considered from a commercial view point, and, that such a solution may be obtained is probably due to the fact that the product (manganous sulfate and other sulfur compounds of manganese) of the reaction of the sulfur gases (either dissolved or as a gas) and manganese oxids is removed by solution in the water as fast as it is formed and that, consequently, even a fairly strong solution, of manganous salts, for example one containing 10% metallic manganese, may be employed with as good results as water in the carrying out of the first step of the process before described. While the statement that a concentrated solution may be obtained in the manner above set forth, may appear to be contrary to what would ordinarily be predicted, without experiment, from the law of mass action, it is nevertheless a fact that the results described above can be secured and clearly the obtainance of this saturated solution is, as before stated, a highly important factor when considered from a commercial viewpoint.

Ordinarily the larger portion of the material dissolved by the action of the sufur gases on the manganese ores will be manganous sulfate. Other compounds of manganese and sulfur may, however, be formed, for example thionates. Also in most of such ores there are comparatively small amounts of other compounds which are also rendered soluble by the action of sulfur gases. These compounds we have found, however, to be not only not harmful when not present in too large amounts, but are on the other hand, of considerable practical advantage as they act as sintering agents to bind together the manganous oxids which are the final product of the process.

When in the carrying out of the process a solution of manganous sulfate together with any other soluble salts resulting from the action of the sulfur gases on the ore, has been obtained, of the desired strength, this solution is evaporated in any apparatus suitable for the purpose and by the use either of fuel, of waste heat from the succeeding step in the process which will be presently described, or by natural evaporation. In any event the salt obtained through the step of evaporation is calcined for the purpose of dissociating and driving off the sulfur dioxid or trioxid content thereof, and the step of calcination is carried on preferably for a period of about three hours and at a degree of temperature ranging between 900° and 1000° C. At this temperature there usually will be little sulfur trioxid formed, the main gaseous product of dissociation being sulfur dioxid and if found advisable or desirable, this expelled gas may by any suitable arrangement of apparatus, be collected and employed in carrying out the first described step in the process. The operation of calcination may be carried out in any suitable apparatus, although it is preferable to employ a rotary kiln similar to that used in the cement industry for producing cement clinker, and a dust collecting device may be provided if found advisable although the amount of dust produced from the calcination of the manganous salts produced through the carrying out of the previously described steps in this process will not be excessive, as the final product of the process is, as previously stated, in a more or less sintered form. It may be necessary to provide a basic lining for those parts of the kiln which are subjected to degrees of temperature exceeding the formation temperature of manganous silicate, since otherwise the manganese oxids which are produced in the calcination will react with the silica present, as for example, the ordinary fire brick lining, and form a fusible slag therewith.

As before stated, the calcination of pure manganous sulfate results in the production of oxid of manganese ($Mn_3O_4$) in the form of a very fine powder which could not be used metallurgically by reason of its fineness and would also be difficult to produce commercially in any ordinary type of apparatus for similar use. We have found, however, that at the above mentioned degrees of temperature at which the step of calcination is carried out, the small amounts of other substances mingled with the impure salts of manganese act as sintering agents and serve to bind together the particles of oxids of manganese which would otherwise be in a powdery condition and as stated, unfit for use.

Under some circumstances it may be desirable to carry out the dissocation step of the process by adding to the crude manganous sulfate a suitable amount of carbonaceous material, such for example as coal, and when such a mixture is subjected to heat, the reduction of the manganous salts to sulfid takes place at a very much lower temperature than that needed for the above described dissociation. Under such conditions the first reaction consists substantially in a reduction of the manganous salts through the action of the carbonaceous material, to manganese sulfid which is readily oxidizable and will be converted into oxids of manganese upon further heating of the mixture in presence of excess air at a comparatively low temperature.

In most cases it will not be practicable to continue heating in the step of calcination to such a degree of temperature and for such a period of time that all of the sulfur content of the crude salts will be driven off. This is due to the fact that the crude manganese sulfate may contain other sulfates principally of the alkali and alkaline earth metals, the dissociation temperature of which lies above that of manganous sulfate. In the calcine, however, these salts will either be dissociated and give up their sulfur or will remain as sulfates. We have found that practically all of the sulfur remaining in the sinter calcine is in the form of water soluble salts and that we may therefore, as before stated, remove these salts practically completely by simply washing the sintered calcine without injuriously affecting the physical character of the sinter for metallurgical use. Commercially this is a valuable point for the reason that a product high in its sulfur content would be very undesirable.

Having thus described the invention, what is claimed as new is:

1. That step in a process for the treatment of ores containing manganese and also containing small quantities of other metalliferous substances, the sulfur salts of which are water soluble and capable of acting as sintering agents, for the extraction of the manganese in form suitable for metallurgical use, which comprises subjecting the ore or the like, suspended in water, to the action of an oxid of sulfur capable of converting the manganese content and the said other metalliferous contents into water soluble salts.

2. That step in a process for the treatment of ores containing manganese and also containing small quantities of other metalliferous substances, the sulfur salts of which are water soluble and capable of acting as sintering agents, for the extraction of the manganese in form suitable for metallurgical use, which comprises subjecting the ore or the like, suspended in water, to the action of sulfur dioxid to convert the manganese content and the said other metalliferous contents into water soluble salts.

3. A process for the extraction of manganese in form suitable for metallurgical use from its ores, which contain also other metalliferous substances, the sulfur salts of which are water soluble and capable of acting as sintering agents, which includes the steps of subjecting the ore or the like, suspended in water, to the action of an oxid of sulfur capable of converting the manganese and other contents into their respective water soluble salts, separating and evaporting the solution, and calcining the crude salt mixture thus obtained at a temperature sufficient to cause dissociation of the manganese salt to produce a sintered manganese oxid.

4. A process for the extraction of manganese in form suitable for metallurgical use from its ores, which contain also other metalliferous substances, the sulfur salts of which are water soluble and capable of acting as sintering agents, which includes the steps of subjecting the ore or the like, suspended in water, to the action of sulfur dioxid to convert the manganese and other contents into their respective water soluble salts, separating and evaporating the solution, and calcining the crude salt mixture thus obtained at a temperature sufficient to cause dissociation of the manganese salt to produce a sintered manganese oxid.

5. A process for the treatment of ores containing manganese and other metalliferous substances, the sulfur salts of which are water soluble and capable of acting as sintering agents, for the purpose of extracting the manganese from the ore or the like in form suitable for metallurgical use, which consists in subjecting the ore or the like, suspended in water, to the action of an oxid of sulfur capable of converting the manganese content into a water soluble manganese salt and converting the said other metalliferous substances into their respective water soluble salts, separating and evaporating the solution thus obtained, calcining the crude salt obtained by the step of evaporation at a temperature sufficient to cause dissociation of the manganese salt thus converting the same into an oxid of manganeses but insufficient to dissociate completely the salts of the said other metals whereby they remain during the step of calcination and act as agents for sintering the oxid of manganese produced, and finally washing the sintered product to remove therefrom a part of all of the water soluble salts of the said other metals.

6. A process for the treatment of ores containing manganese and other metalliferous substances, the sulfur salts of which are water soluble and capable of acting as sintering agents, for the purpose of extracting the manganese from the ore or the like in form suitable for metallurgical use, which consists in subjecting the ore or the like, suspended in water, to the action of sulfur dioxid to convert the manganese content into a water soluble manganese salt and converting the said other metalliferous substances into their respective water soluble salts, separating and evaporating the solution thus obtained, calcining the crude salt obtained by the step of evaporation at a temperature sufficient to cause dissociation of the manganese salt thus converting the same into an oxid of manganese but insufficient to dissociate completely the salts of the said other metals whereby they remain during the step of calcination and act as agents for sintering the oxid of manganese produced, and finally washing the sintered product to remove therefrom a part or all of the water soluble salts of the said other metals.

7. A cyclic process for the extraction of manganese from its ores or the like in form suitable for metallurgical use, which consists in subjecting the ore or the like, in suspension, to the action of an oxid of sulfur whereby to convert the manganese content into a water soluble manganese salt, reëmploying the solution thus obtained as a menstruum for the suspension of successive batches of the ore or the like in carrying out the first-mentioned step, evaporating substantially concentrated solutions of the manganese salt as they attain such strength, calcining the crude manganese salt thus obtained to cause dissociation thereof whereby to obtain oxid of manganese and oxid of sulfur, and utilizing the oxid of sulfur in the subsequent carrying out of the first-mentioned step.

8. A cyclic process for the extraction of manganese from its ores or the like in form suitable for metallurgical use, which consists in subjecting the ore or the like, in suspension, to the action of sulfur dioxid whereby to convert the manganese content into a water soluble manganese salt, reëmploying the solution thus obtained as a menstruum for the suspension of successive batches of the ore or the like in carrying out the first-mentioned step, evaporating substantially concentrated solutions of the manganese salt as they attain such strength, calcining the crude manganese salt thus obtained to cause dissociation thereof whereby to obtain oxid of manganese and sulfur dioxid, and utilizing the sulfur dioxid in the subsequent carrying out of the first-mentioned step.

In testimony whereof we affix our signatures.

GEORGE D. VAN ARSDALE. [L. S.]
CHARLES G. MAIER.